United States Patent
Cowan et al.

(10) Patent No.: US 11,754,111 B2
(45) Date of Patent: Sep. 12, 2023

(54) COMPRESSION FIT EME PROTECTION SEAL CAP

(71) Applicant: THE BOEING COMPANY, Chicago, IL (US)

(72) Inventors: Daniel J. Cowan, North Charleston, SC (US); Bart Stevens, Summerville, SC (US)

(73) Assignee: The Boeing Company, Chicago, IL (US)

( * ) Notice: Subject to any disclaimer, the term of this patent is extended or adjusted under 35 U.S.C. 154(b) by 549 days.

(21) Appl. No.: 16/819,605

(22) Filed: Mar. 16, 2020

(65) Prior Publication Data

US 2021/0285481 A1    Sep. 16, 2021

(51) Int. Cl.
*F16B 37/14*    (2006.01)
*F16B 33/00*    (2006.01)
*B64D 45/02*    (2006.01)

(52) U.S. Cl.
CPC ............ *F16B 37/14* (2013.01); *F16B 33/004* (2013.01); *B64D 45/02* (2013.01)

(58) Field of Classification Search
CPC ...... F16B 33/004; F16B 37/14; F16B 43/001; B64D 45/02; Y10S 411/91
USPC ......... 411/82, 82.1, 366.1, 369, 372.5, 372.6
See application file for complete search history.

(56) References Cited

U.S. PATENT DOCUMENTS

| | | | |
|---|---|---|---|
| 1,368,637 A | 2/1921 | McFarland | |
| 1,868,084 A | 7/1932 | Wheelwright | |
| 2,020,522 A | 11/1935 | Seguin | |
| 3,241,427 A * | 3/1966 | Krell | F16B 37/14 411/374 |
| 3,699,368 A | 10/1972 | Palmer | |
| 4,013,190 A | 3/1977 | Wiggins et al. | |
| 4,295,766 A | 10/1981 | Shaw | |
| 4,519,974 A | 5/1985 | Bravenec et al. | |
| 4,630,168 A | 12/1986 | Hunt | |
| 4,636,446 A | 1/1987 | Lee | |
| 4,749,321 A * | 6/1988 | Knohl | F16B 37/14 411/372.5 |
| 4,826,380 A | 5/1989 | Henry | |

(Continued)

FOREIGN PATENT DOCUMENTS

| | | |
|---|---|---|
| CA | 2856687 A1 | 3/2015 |
| CA | 2858461 A1 | 3/2015 |

(Continued)

OTHER PUBLICATIONS

Extended EP Search Report for EP Application No. 19204019.4 dated Mar. 30, 2020.

(Continued)

*Primary Examiner* — Roberta S Delisle
(74) *Attorney, Agent, or Firm* — Quinn IP Law (57) ABSTRACT

A protection seal cap for enclosing an end portion of a fastener which extends from a structure, which includes a cap member, which includes a sidewall that defines an interior space within the cap member. The sidewall forms a continuous wall member positioned within the cap member. The continuous wall member defines an opening providing access to the interior space. The continuous wall member is configured to create an interference compression fit between the end portion of the fastener and the continuous wall member.

20 Claims, 7 Drawing Sheets

(56) References Cited

U.S. PATENT DOCUMENTS

| | | |
|---|---|---|
| 4,850,778 A | 7/1989 | Clough et al. |
| 4,884,933 A | 12/1989 | Preusker et al. |
| 5,108,853 A | 4/1992 | Feres |
| 5,350,266 A | 9/1994 | Espey et al. |
| 5,752,794 A | 5/1998 | Krawczak |
| 6,053,683 A | 4/2000 | Cabiran |
| 6,102,128 A | 8/2000 | Bridgeman |
| 6,318,942 B1 | 11/2001 | Wieczorek |
| 7,134,666 B2 | 11/2006 | Beyssac et al. |
| 7,755,876 B2 | 7/2010 | Morrill et al. |
| 7,918,081 B2 | 4/2011 | Schlichting et al. |
| 7,936,550 B2 | 5/2011 | Morrill et al. |
| 8,318,942 B2 | 11/2012 | Zhang |
| 8,388,293 B2 | 3/2013 | Hutter, III |
| 8,711,541 B2 | 4/2014 | Umemoto et al. |
| 8,717,735 B2 | 5/2014 | Day et al. |
| 8,717,736 B2 | 5/2014 | Asahara et al. |
| 8,840,740 B2 | 9/2014 | Rorabaugh et al. |
| 8,894,338 B2 | 11/2014 | Dobbin et al. |
| 9,011,062 B2* | 4/2015 | Chirol .................... B64D 45/02 411/372.5 |
| 9,133,874 B2 | 9/2015 | Hill |
| 9,188,226 B2 | 11/2015 | Pajel et al. |
| 9,228,604 B2 | 1/2016 | Dobbin |
| 9,764,854 B2 | 9/2017 | Dobbin et al. |
| 10,151,337 B2 | 12/2018 | Hill |
| 10,501,202 B2 | 12/2019 | Roper et al. |
| 10,655,667 B2 | 5/2020 | Stevens et al. |
| 10,729,043 B1* | 7/2020 | Boettcher ............... F16K 13/00 |
| 10,920,818 B2 | 2/2021 | Cowan et al. |
| 10,948,004 B2 | 3/2021 | Auffinger et al. |
| 10,962,043 B2 | 3/2021 | Stevens et al. |
| 10,982,704 B2 | 4/2021 | Auffinger et al. |
| 10,989,244 B2 | 4/2021 | Auffinger et al. |
| 11,022,164 B2 | 6/2021 | Roper et al. |
| 11,078,947 B2 | 8/2021 | Roper et al. |
| 11,236,777 B2* | 2/2022 | Stevens ................. F16B 33/004 |
| 11,571,595 B2 | 2/2023 | Damazo et al. |
| 2002/0192052 A1 | 12/2002 | Ruspa |
| 2008/0137259 A1 | 6/2008 | Heeter et al. |
| 2009/0128983 A1 | 5/2009 | Hernandez |
| 2009/0194297 A1 | 8/2009 | Ortiz Teruel |
| 2010/0303582 A1 | 12/2010 | Choi et al. |
| 2012/0217673 A1 | 8/2012 | Hutter, III |
| 2013/0206759 A1 | 8/2013 | Wurz et al. |
| 2013/0223951 A1 | 8/2013 | Bessho et al. |
| 2013/0322982 A1* | 12/2013 | Dobbin ................. F16B 33/004 29/525.02 |
| 2014/0048198 A1 | 2/2014 | Dobbin et al. |
| 2014/0261956 A1 | 9/2014 | Wiseman et al. |
| 2014/0341675 A1 | 11/2014 | Dobbin |
| 2014/0373359 A1 | 12/2014 | Schomaker et al. |
| 2015/0060465 A1 | 3/2015 | Limbacher et al. |
| 2015/0082603 A1 | 3/2015 | Rawdon et al. |
| 2015/0086295 A1 | 3/2015 | Cameron et al. |
| 2015/0184688 A1 | 7/2015 | Dobbin et al. |
| 2015/0345533 A1 | 12/2015 | Hill |
| 2016/0076577 A1* | 3/2016 | Rizzello ................ F16B 11/006 29/460 |
| 2016/0131179 A1 | 5/2016 | Prouty et al. |
| 2016/0159493 A1* | 6/2016 | Dobbin ................. F16B 33/004 411/82.1 |
| 2016/0195125 A1* | 7/2016 | Dobbin ................. B64D 45/02 411/372.6 |
| 2016/0245330 A1* | 8/2016 | Dobbin ................. F16B 37/14 |
| 2017/0021209 A1 | 1/2017 | Damazo et al. |
| 2017/0050746 A1 | 2/2017 | Dobbin |
| 2017/0082131 A1 | 3/2017 | Bessho et al. |
| 2019/0241276 A1 | 8/2019 | Dobbin |
| 2019/0301515 A1* | 10/2019 | Dobbin ................. F16B 33/004 |
| 2021/0164513 A1 | 6/2021 | Cowan et al. |
| 2021/0190124 A1 | 6/2021 | Stevens et al. |

FOREIGN PATENT DOCUMENTS

| | | |
|---|---|---|
| CN | 105408642 A | 3/2016 |
| CN | 105473445 A | 4/2016 |
| CN | 107298182 A | 10/2017 |
| CN | 107448463 A | 12/2017 |
| DE | 1085586 B | 7/1960 |
| EP | 2610506 A1 | 7/2013 |
| EP | 2698318 A2 | 2/2014 |
| EP | 2713065 A2 | 4/2014 |
| EP | 2812248 A1 | 12/2014 |
| EP | 2860410 A1 | 4/2015 |
| EP | 2860411 A1 | 4/2015 |
| EP | 2996941 A1 | 3/2016 |
| EP | 3027917 A1 | 6/2016 |
| EP | 3059170 A1 | 8/2016 |
| EP | 3106380 A1 | 12/2016 |
| EP | 3287362 A1 | 2/2018 |
| EP | 3462046 A1 | 4/2019 |
| EP | 3546374 A1 | 10/2019 |
| GB | 612381 A | 11/1948 |
| JP | H02102910 A | 4/1990 |
| JP | H03125911 U | 12/1991 |
| JP | H08-145032 A | 6/1996 |
| JP | 2000039010 A | 2/2000 |
| JP | 2001165138 A | 6/2001 |
| JP | 2002266832 A | 9/2002 |
| JP | 2004169853 A | 6/2004 |
| RU | 2014128760 A | 2/2016 |
| WO | WO-9729289 A1 | 8/1997 |
| WO | WO-0057069 A1 | 9/2000 |
| WO | WO-2009063063 A1 | 5/2009 |
| WO | WO-2012147645 A1 | 11/2012 |
| WO | WO-2012170672 A1 | 12/2012 |
| WO | WO-2013117756 A1 | 8/2013 |
| WO | WO-2013178985 A1 | 12/2013 |
| WO | WO-2014118117 A1 | 8/2014 |
| WO | WO-2014118510 A1 | 8/2014 |
| WO | WO-2014184722 A1 | 11/2014 |
| WO | WO-2015015153 A1 | 2/2015 |
| WO | WO-2015025130 A1 | 2/2015 |

OTHER PUBLICATIONS

Written Opinion for EP Application No. 19204019.4 dated Mar. 30, 2020.
Extended European Search Report for EP Application No. 21161373.2 dated Jul. 21, 2021.
Color Photographs of Boeing Proprietary, Zap Cap Further Screening Test Plan for 787 Fuel Tank Use, Mar. 24, 2016, 2 pg.
Extended European Search Report for EP Application No. 20176033.7 dated Oct. 23, 2020.
Drawings of Boeing Part Standard, BACC50AP, dated Feb. 2, 2017, 2 pgs.
Photographs of Boeing Proprietary, Zap Cap Further Screening Test Plan for 787 Fuel Tank Use, Mar. 24, 2016, 1 pg.
http://www.ppgaerospace.com/getmedia/9a234ec3-1db9-48de-94f7-c212ac2ba705/SealCapFlyer.pdf.aspx, PPG Aerospace PRC Seal Caps, retrieved Sep. 7, 2016.
http://www.porex.com/files/documents/Porex-Battery-Vents-Letter—English, Porex Battery Vents, 2013.
Extended European Search Report for foreign counterpart EP Application No. 16173069, dated Nov. 17, 2016.
Product Literature for ERG Duocel Aluminum Foam, downloaded from ERO Aerospace website, www.ergaerospace.com/literature/erg_duocel.pdf, Jul. 9, 2015.
"HRL Researchers Develop World's Lightest Material," downloaded from HRL Laboratories website, www.hrl.com/hrlDocs/pressreleases/2011/prsRls_111117, Jul. 10, 2015.
Daniel J. Cowan et al., U.S. Appl. No. 15/964,340, filed Apr. 27, 2018.
Bart Stevens et al., U.S. Appl. No. 15/718,618, filed Sep. 28, 2017.
Sean Auffinger et al., U.S. Appl. No. 16/046,316, filed Jul. 26, 2018.
Bart Stevens et al., U.S. Appl. No. 15/960,835, filed Apr. 24, 2018.
Toulouse, Mixed Metal-Composite Assembly, May 2013.

(56) References Cited

OTHER PUBLICATIONS

Hutchinson Proprietary Document, Accessories: TP Nutcaps, 1 page.
Click Bond Cap dated May 16, 2016, 4 pgs.
Extended European Search Report for EP Application No. 18196707.6 dated Feb. 19, 2019.
EP Search Report for Application No. EP14175808 dated Mar. 6, 2015.
Prc-Desoto International, Inc., "Technical Data Sheet Aerospace Sealants Customized Sealant Solutions PRC(R) Seal Caps," May 1, 2017, Lit, #4086, Sylmar, CA, pp. 1-2; retrieved on Dec. 4, 2018, retrieved from internet: http://www.ppgaerospace.com/getmedia/9a234ec3-1db9-48de-94f7-c212ac2ba705/SealCapFlyer.pdf.aspx.
Porex Corporation, "Porex(R) Battery Vents—Flame Arrestors," Porex Advanced Porous Materials, PXT-621-080513-00, Jan. 1, 2013, pp. 1-2, retrieved on Dec. 4, 2018, retrieved from internet: http://www.porex.com//files/documents/POREX-Battery-Vents-Letter-for-Web.pdf.
"Customized Sealants Solutions: PRC® Seal Caps," PPG Aerospace, product literature downloaded from ppaerospace.com on Sep. 7, 2016.
"HRL Researchers Develop World's Lightest Material," downloaded from HRL Laboratories website, HRL.com on Jul. 10, 2015.
"ERG Duocel® aluminum foam," product literature downloaded from ERG Aerospace website, ERGaerospace.com on Jul. 9, 2015.
Office Action for RU Application No. 2018127328/07 dated May 20, 2019.
EP Search Report for EP Application No. 19167831.7 dated Aug. 29, 2019.
EP Search Report for Application No. EP19166688 dated Aug. 29, 2019.
EP Office Action for Application No. 19166688.2 dated Sep. 20, 2019.
European Search Report for Application No. 19179944.4 dated Sep. 10, 2019.
Communication Pursuant to Article 94(3) dated Oct. 16, 2019.
Office Action for CA Application No. 3,038,285 dated May 12, 2022.
Notification of Second Office Action for CN Application No. 2019103416596 dated Jul. 19, 2022.
Extended EP Search Report for EP Application No. 19207962.2 dated Mar. 26, 2020.
Communication Pursuant to Article 94(3) EPC for EP Application No. 19167831.7 dated Feb. 23, 2022.
First Office Action for CN Application No. 2019103311537 dated Feb. 22, 2022.
Search Report for CN Application No. 2019103311537 dated Feb. 22, 2022.
Notification of First Office Action for CN Application No. 2019103416596 dated Mar. 7, 2022.
Extended European Search Report for EP Application No. 22152477.0 dated Apr. 21, 2022.
European Search Report for EP Application No. EP19217717 dated May 8, 2020.

\* cited by examiner

COMPRESSION FIT EME PROTECTION SEAL CAP

FIELD

This disclosure relates to an electromagnetic effect ("EME") protection seal cap and more particularly to an EME protection seal cap which is employed to cover a portion of a fastener which extends from a surface within an aircraft to prevent sparking within the interior of the aircraft.

BACKGROUND

Current installation of EME protection seal caps, which cover an end portion of a fastener extending from a surface within an aircraft, requires much time, labor and cost and experiences a high rate of defective installations. Defective installation of an EME protection seal cap requires re-installation of the defectively installed protection seal cap whether during fabrication of the aircraft or during in-service maintenance of the aircraft. Since select aircraft utilize potentially thousands of EME protection seal caps, savings on installation and improvement on quality installations are of high value.

Regardless of fabrication of the aircraft or in-service maintenance of the aircraft, the EME protection seal caps will be inspected and if determined to not meet specifications, the EME protection seal caps will be scraped off and replaced. The replacement of the protection seal caps for in-service maintenance, which occur in the field, will experience installation of the protection seal caps within confined space within the aircraft in contrast to a controlled environment of a factory at time of fabrication of the aircraft. The installation of the EME protection seal cap requires the installer to hold the protection seal cap in place on a structure of the aircraft for approximately a minute while sealant, used in the installation of the protection seal cap, decompresses under the protection seal cap.

Without holding the protection seal cap in place during decompression of the sealant, the decompression of the sealant will cause liftoff of the protection seal cap with respect to the surface of the structure to which the protection seal cap is being secured. Liftoff of the protection seal cap is unacceptable and requires re-installation of the protection seal cap resulting in additional labor and cost.

There is a need to improve on the time expended for installation of protection seal caps including reducing the number of quality defects, which require re-installation of the protection seal cap. There is also a need to reduce the effort expended by the installer with respect to holding the protection seal cap during application of sealant and during decompression of the sealant, particularly in confined locations and also where installation orientations provide gravity challenges with respect to maintaining the protection seal cap in a desired position. In addition, there is a need to install a protection seal cap at the time of in-service maintenance wherein removal of all of the old sealant from the fastener is not required.

SUMMARY

An example includes a protection seal cap for enclosing an end portion of a fastener which extends from a structure, which includes a cap member, which includes a sidewall that defines an interior space within the cap member. The sidewall forms a continuous wall member positioned within the cap member. The continuous wall member defines an opening providing access to the interior space. The continuous wall member is configured to create an interference compression fit between the end portion of the fastener and the continuous wall member.

An example includes a method for holding a protection seal cap against a structure and enclosing an end portion of a fastener which extends from the structure. The method includes positioning a cap member of the protection seal cap over the end portion of the fastener, wherein the cap member includes a sidewall which defines an interior space within the cap member. The sidewall forms a continuous wall member which defines an opening providing access to the interior space. The continuous wall member is configured to create an interference compression fit between the end portion of the fastener and the continuous wall member. The method further includes deforming of the continuous wall member creating an interference compression fit between the continuous wall member and the end portion of the fastener.

The features, functions, and advantages that have been discussed can be achieved independently in various embodiments or may be combined in yet other embodiments further details of which can be seen with reference to the following description and drawings.

DESCRIPTION

Figure 1:
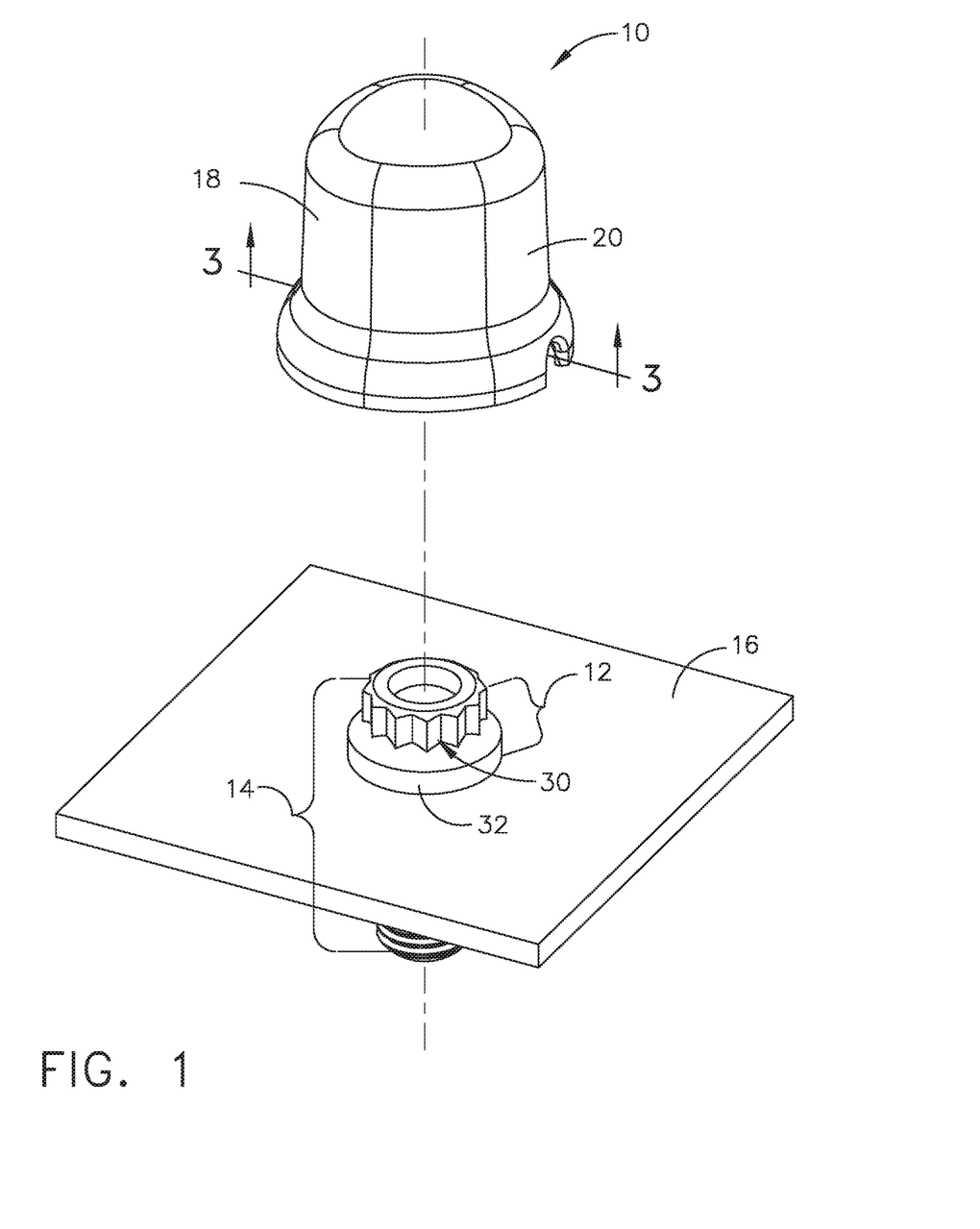
FIG. 1 is an exploded perspective of the protection seal cap for enclosing an end portion of a fastener which extends from a structure.
Figure 2:
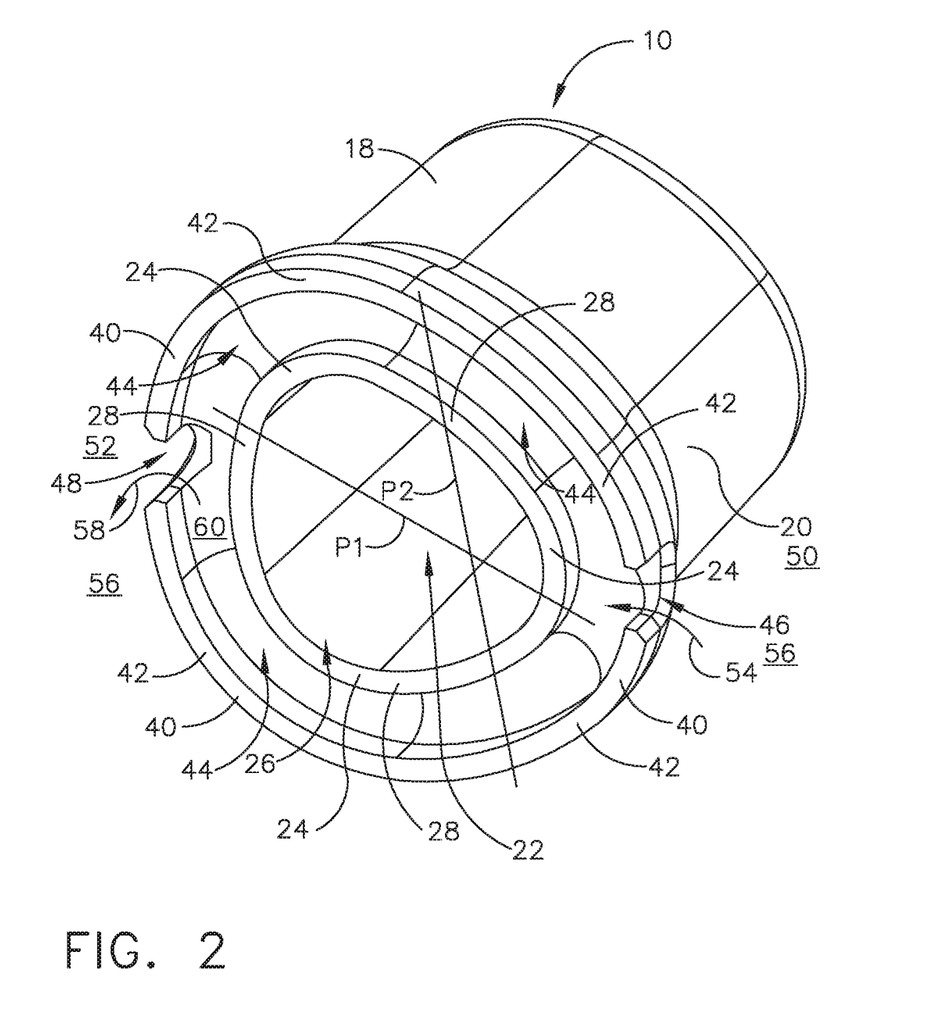
FIG. 2 is an enlarged bottom perspective view of the protection seal cap.

In referring to FIGS. 1 and 2, protection seal cap 10, for enclosing an end portion 12 of fastener 14 extending from structure 16 includes cap member 18. Cap member 18 includes sidewall 20, which defines interior space 22 within cap member 18. Sidewall 20 forms continuous wall member 24, as seen in FIG. 2, which defines opening 26 providing access to interior space 22. Continuous wall member 24 is configured to create an interference compression fit between end portion 12 of fastener 14 and continuous wall member 24.

Figure 3:
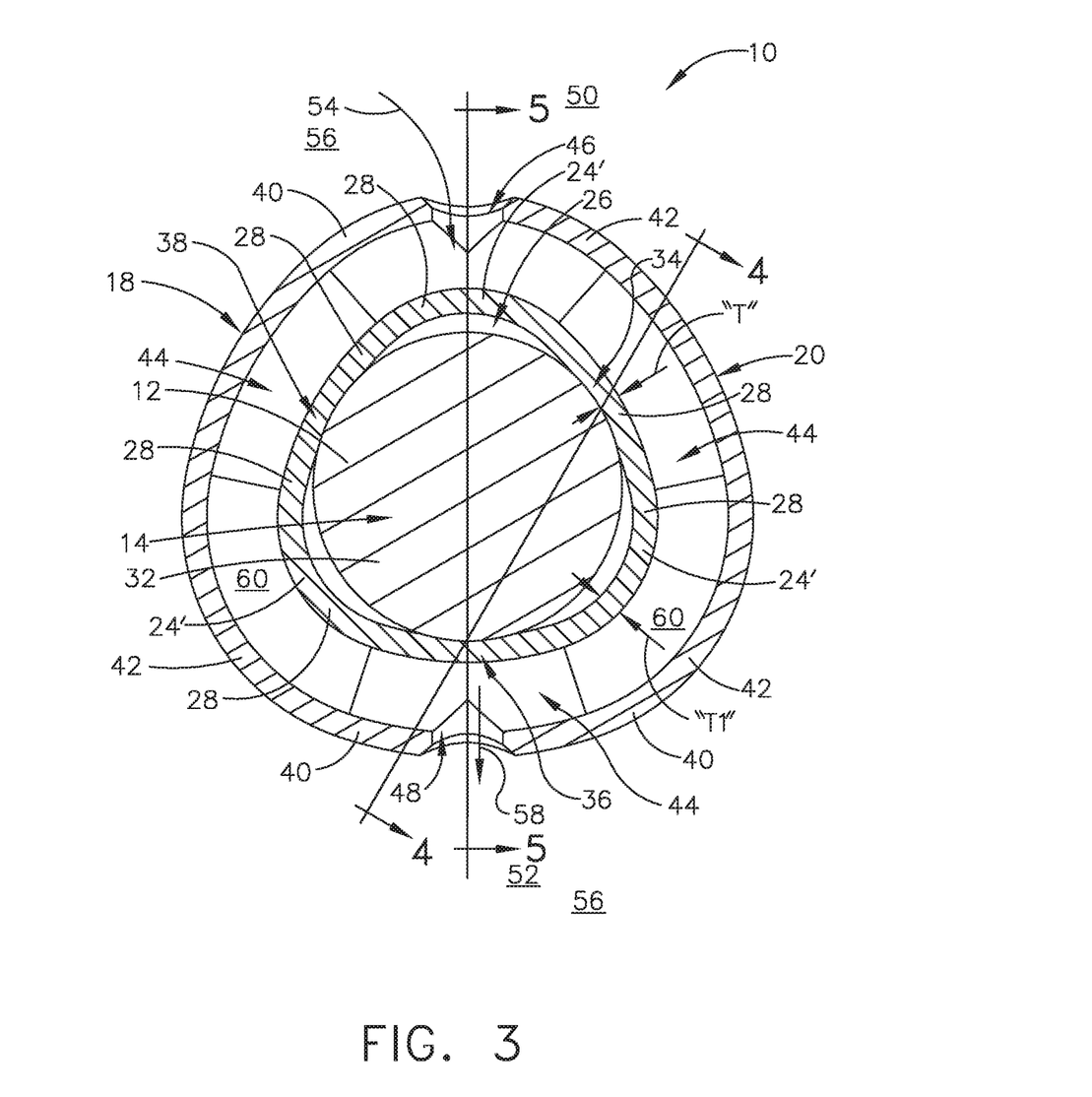
FIG. 3 is a cross section view along line 3-3 of FIG. 1 with an end portion of the fastener positioned enclosed within the protection seal cap deforming a continuous wall member.
Figure 4:
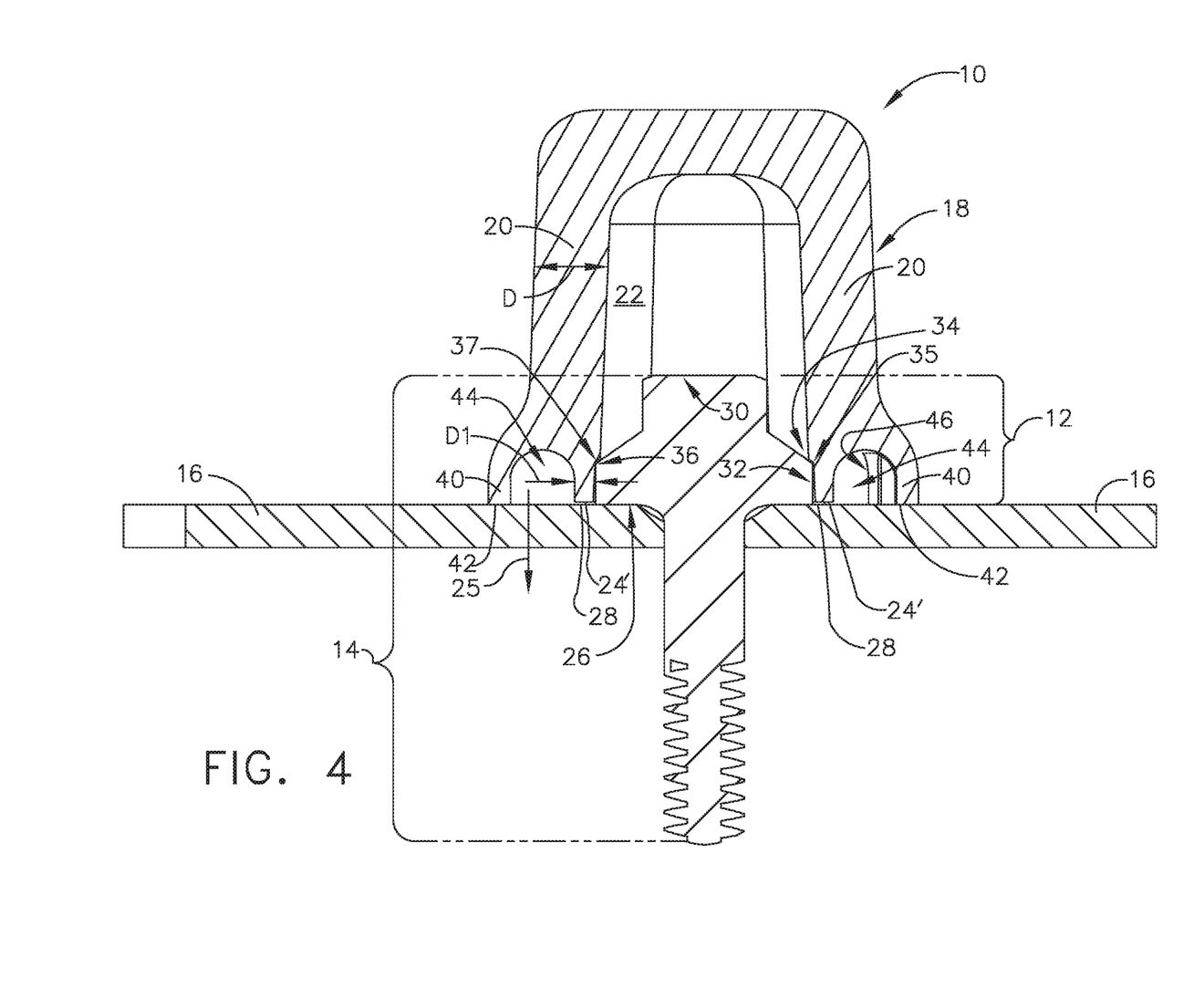
FIG. 4 is a cross section of the protection seal cap and the fastener along line 4-4 in FIG. 3A.
Figure 5:
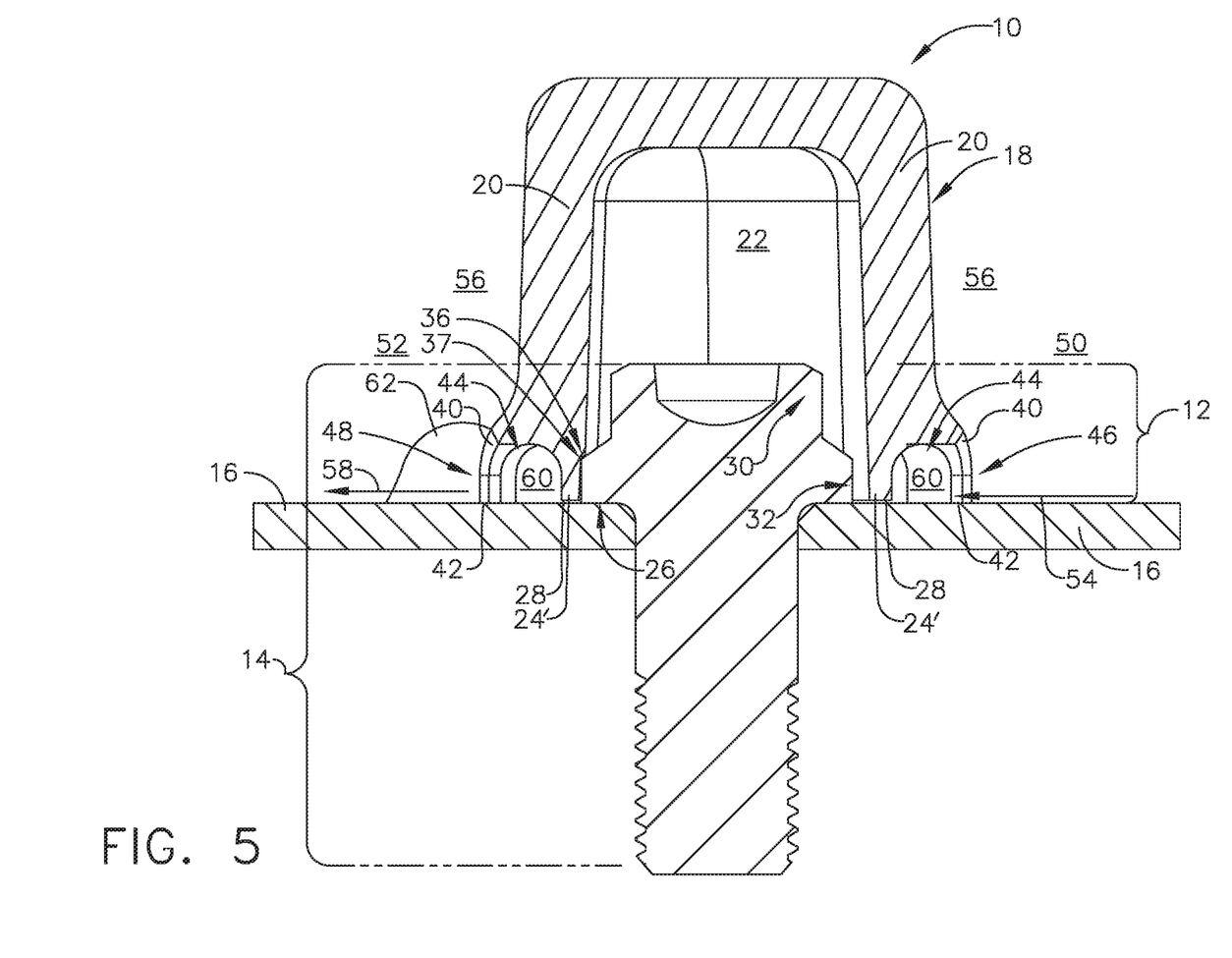
FIG. 5 is a cross section of the protection seal cap and the fastener along line 5-5 in FIG. 3A.

With respect to discussion related to continuous wall member 24, continuous wall member is designated as 24 in a non-deformed condition, as seen in FIG. 2, and will be referred to as 24' with continuous wall member being in a deformed condition by way of an interference compression fit between the continuous wall member and end portion 12 of fastener 14, as seen in FIGS. 3-5. With respect to continuous wall member 24', sidewall 20, as seen in FIG. 4, has a width dimension D greater than first width dimension D1 of continuous wall member 24'. Continuous wall member 24' extends in direction 25 away from sidewall 20 of cap member 18. Continuous wall member 24 has first end surface 28, as seen in FIG. 2. First end surface 28 of continuous wall member 24 is positioned within first plane P1, as seen in FIG. 2 wherein first plane P1 is shown as a line designated as P1 and is aligned along first end surface 28 representing first end surface 28 being in first plane P1.

End portion 12 of fastener 14, in this example, includes a tool interface configuration 30, as seen in FIG. 1, for engaging fastener 14 with a compatible configuration of a tool so as to facilitate the tool gripping fastener 14 for tightening or loosening fastener 14 relative to structure 16. Tool interface configuration 30 can take on various shapes so long as the shape is compatible with being gripped by a particular tool for tightening or loosening fastener 14. In this example, end portion 12 of fastener 14, also includes a cylindrical portion 32 positioned adjacent to tool interface configuration 30 on one side of cylindrical portion 32 and positioned to abut structure 16 on an opposing side of cylindrical portion 32. In this example, a twelve point bolt head is the tool interface configuration 30 along with cylindrical portion 32 are known as a head portion of fastener 14. Head portions of fasteners 14 can take on a wide variety of shapes and dimensions. In this example, when fastener 14 is tightened cylindrical portion 32 applies a compressive force against structure 16 along with a nut or a swaged collar (not shown) positioned on fastener 14 on an opposing side of structure 16.

As mentioned above, a head portion of end portion 12 of fastener 14 can take on a wide variety of configurations and sizes. Similarly, end portion 12 of fastener 14 can be positioned on an opposing side of fastener 14 and can take on one of a variety of configurations and sizes which include, for example, a wide variety of nut(s) (not shown) or a wide variety of nut(s) and washer(s) (also not shown). In applying cap member 18 to end portion 12 of fastener 14, cap member 18 can be used to engage either end portion 12 of fastener 14 as needed in fabrication or maintenance of an aircraft. Cap member 18 can be used to enclose end portion 12 of fastener 14 which includes the head portion of the fastener 14 as shown for example in FIGS. 1-5 or to enclose end portion 12 of fastener 14 which includes the nut(s) or nut(s) and washer(s) portion of the fastener 14 on an opposing end of the fastener 14 which is not shown. In either application, continuous wall member 24 creates an interference compression fit with an end portion 12 of fastener 14 such that cap member 18 positioned against structure 16 holds position with respect to fastener 14 and encloses end portion 12 of fastener 14 within cap member 18 and structure 16. In accomplishing this interference compression fit, opening 26 of cap member 18, defined by continuous wall member 24 can be shaped and dimensioned by continuous wall member 24 so as to create the interference compression fit with end portion 12 of fastener 14 of either end portion of fastener 14, as described above, as needed. For example, the interference compression fit would be made with the head portion of fastener 14, as seen in the example shown in FIGS. 4 and 5, or with nut(s), nut(s) and washer(s) or a swaged collar of fastener 14 (not shown).

In the present example, opening 26, as seen in FIG. 2, formed by continuous wall member 24, can take on one of a wide variety of shapes and sizes. So long as the shape and size of continuous wall member 24 allows continuous wall member 24 to encounter end portion 12 of fastener 14 such that end portion 12 of fastener 14 contacts and deforms continuous wall member 24' and an interference compression fit is created between end portion 12 and continuous wall member 24'.

As seen in FIG. 3, continuous wall member 24', in this example, is deformed by end portion 12 of fastener 14 at three spaced locations 34, 36 and 38 of continuous wall member 24'. Deformation of continuous wall member 24', in this example, includes compressing portions of continuous wall member 24' which contact cylinder portion 32 of end portion 12 of fastener 14. The compression deformation of continuous wall member 24' occurs, in this example, at each of the three locations 34, 36 and 38. For example, at location 34 continuous wall member 24 has thickness "T" where cylinder portion 32 is in contact with continuous wall member 24' in contrast to continuous wall member 24' having a greater thickness "T1" between contact location 34 and contact location 36 where end portion 12 of fastener 14 is not in contact with continuous wall member 24'. This deformation of continuous wall member 24' occurs with cap member 18 being constructed of a material such as thermoplastic or thermoset which is less hard than metal construction, in this example, of end portion 12 of fastener 14. The deformation of continuous wall member 24' is seen in FIG. 4 at location 36 as deformation 37 and at location 34 as deformation 35 and similarly shown in FIG. 5 at location 36 as deformation 37. Such deformation similarly occurs in this example at location 38.

Figure 3A:
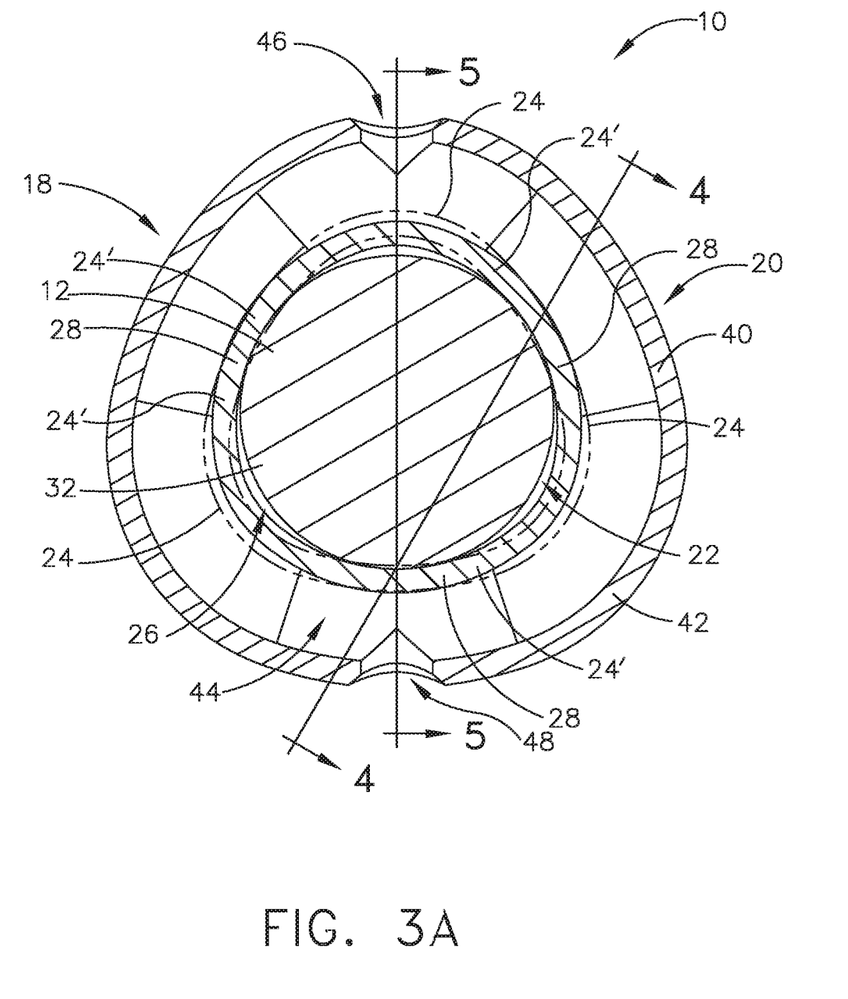
FIG. 3A is the view of FIG. 3 with a phantom view of a configuration of the continuous wall member of FIG. 2 wherein the configuration of the continuous wall member is not deformed by an end portion of the fastener.

In this example, further deformation of continuous wall member 24' occurs with deformation of the overall configuration or shape of continuous wall member 24' which effects shape of opening 26 with end portion 12 of fastener 14 positioned within opening 26 surrounded by and in contact with continuous wall member 24'. The shape of continuous wall member 24' becomes distorted as seen in FIG. 3A. Continuous wall member 24, in a non-deformed and undistorted state of FIG. 2 is shown in FIG. 3A in phantom and designated as continuous wall member 24. Continuous wall member 24', which is deformed and distorted by end portion 12 of fastener 14 is designated in FIG. 3A as continuous wall member 24'.

With deformation of continuous wall member 24' at locations 34, 36 and 38 along with the distortion in shape of continuous wall member 24', a compression interference fit is created between end portion 12 of fastener 14 and continuous wall member 24' creating friction between continuous wall member 24' and end portion 12 of fastener 14. With cap member 18 positioned against structure 16, the compression friction maintains cap member secured to fastener 14 and end portion 12 of fastener 14 enclosed within cap member 18. With continuous wall member 24' gripping end portion 12 of fastener 14 by way of the interference compression and resulting friction, cap member 18 can be positioned and secured into any orientation onto structure 16 within an aircraft regardless of gravitational forces operating on cap member 18. This orientation can include extreme orientations of cap member 18 such as being positioned upside down on a surface, positioned on a vertical surface or positioned on an inclined surface without the individual installer needing to hold cap member 18 in place. The holding of cap member 18 in place, by way of the interference compression fit and maintaining end portion 12 of fastener 14 enclosed within cap member 18 and structure 16, as will be described below, cap member 18 is in proper position during injecting of sealant within cap member 18 facilitating installation of cap member 18 and in proper position during decompression of sealant without any need for the installer to hold cap member 18 in place providing enhanced rate of quality installations. Moreover, the compression fit capabilities of continuous wall member 24' also provides installer the ability to not have to remove all sealant in an in-service maintenance of the aircraft. The compression interference fit will accommodate cap member 18 gripping end portion 12 of fastener 14 without all sealant being removed from the end portion 12 of fastener 14 and provide installer from needing to remove all sealant when installing of cap member 18.

In referring to FIGS. 2, 3, 4 and 5, sidewall 20 forms wall member 40 positioned spaced apart from continuous wall member 24, 24'. Wall member 40 extends in direction 25 as seen in FIG. 4, away from sidewall 20 of cap member 18 which defines interior space 22. Wall member 40 has second end surface 42. Second end surface 42 is configured such that second end surface 42 extends within a second plane P2, as seen in FIG. 2, wherein second plane P2 is shown as a line designated as P2 and aligned along second end surface 42 representing second end surface 42 being in second plane P2. In this example, first end surface 28 and second end surface 42 are coplanar. In other examples of cap member 18, first and second planes P1 and P2 are not coplanar with one another but are parallel to one another. Such configuration would for example, have first end 28, with cap member 18 positioned on structure 16, be positioned slightly separated from the surface of structure 16 ensuring second end surface 42 to be in contact with the surface of structure 16. This configuration would prevent sealant 62 from escaping channel 44 to outside 56 of cap member 18, described below, and thereby prevent additional cleaning of sealant 62 from the surface of structure 16 versus sealant 62 escaping from channel 44 past first end 28 into interior space 22 which is acceptable.

In referring to FIGS. 2, 3, 4 and 5, channel 44, defined by sidewall 20 of cap member 18, is positioned extending about continuous wall member 24, 24' and positioned between continuous wall member 24, 24' and wall member 40. Wall member 40 defines two ports 46, 48 which extend through wall member 40 which are spaced from one another. Two ports 46, 48 are each positioned on opposing sides 50, 52 of cap member 18. Each of the two ports 46, 48 are in fluid communication with channel 44. First flow path 54 extends from outside 36 a cap member 18 through, for example, port 46 of the two ports 46, 48 and into the channel 44. Second flow path 58 extends from inside 60 of channel 44 to port 48 of the two ports 46, 48 and through port 48 of two ports 46, 48 to outside 56 of cap member 18. This configuration permits installer to inject sealant 62 through for example port 46 of two ports 46, 48 with sealant 62 exiting port 48 of two ports 46, 48, as seen in FIG. 5. With sealant moving out of port 48 in this example, the installer is provided an indication that sealant 62 has flowed through channel 44 and is present within channel 44.

As earlier discussed, fastener 14 is constructed of a harder material than that of the material which constructs continuous wall member 24, 24' such that with a force applied by the end portion 12 of fastener 14 against continuous wall member 24 continuous wall member 24' deforms. The deformation of continuous wall member 24, 24' provides the interference compression fit between continuous wall member 24' and end portion 12 of fastener 14 properly holding cap member 18 in position for sealant 62 injection to be accomplished and for decompression of sealant 62 to occur without cap member 18 experiencing unwanted liftoff of cap member 18 from structure 16.

Figure 6:
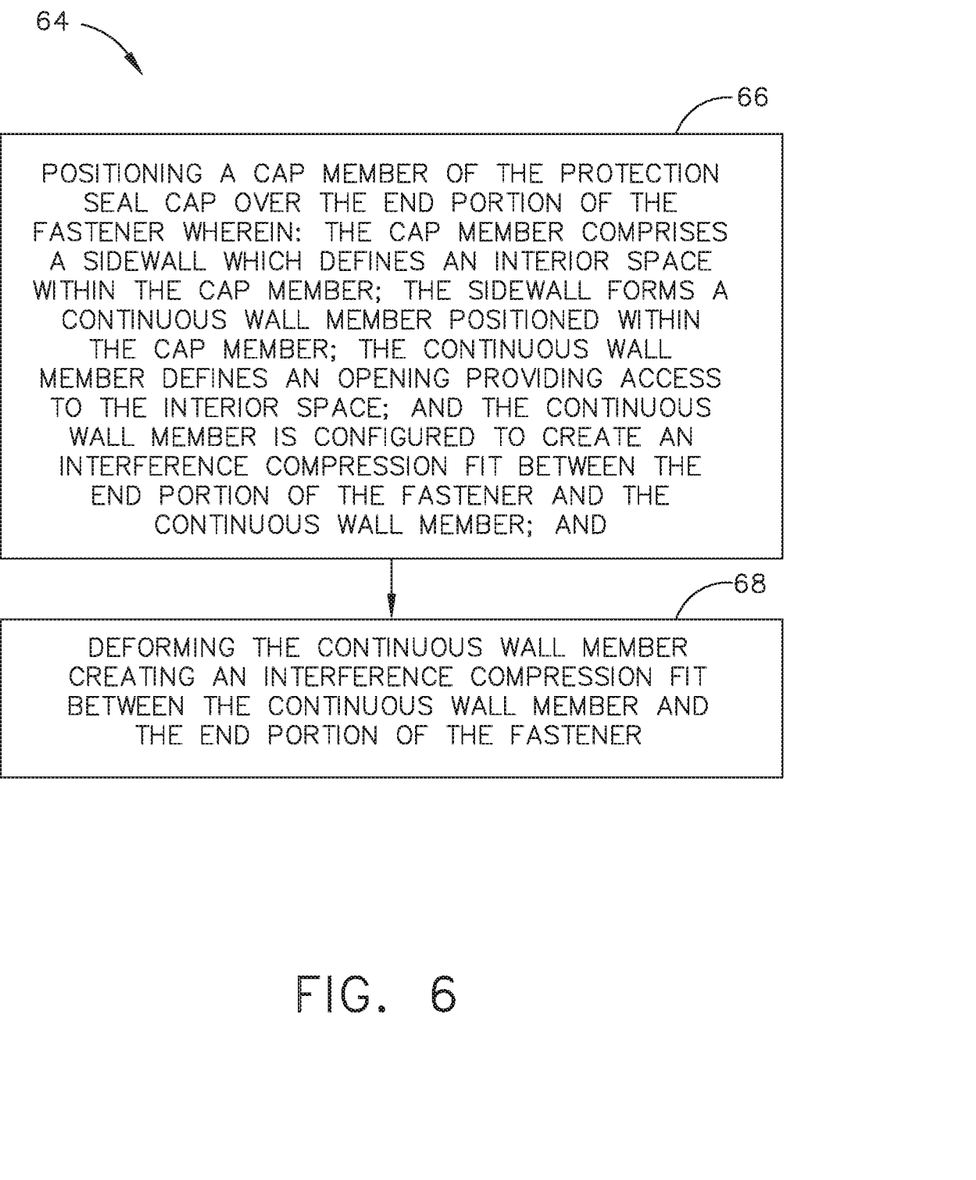
FIG. 6 is a flow chart of a method for holding a protection seal cap against a structure and enclosing an end portion of a fastener which extends through the structure.

In referring to FIG. 6, method 64 is shown for holding protection seal cap 10 against structure 16 and enclosing end portion 12 of fastener 14 which extends from structure 16. Method 64 includes positioning 66 cap member 18 of protection seal cap 10 over end portion 12 of fastener 14. Cap member 18 includes sidewall 20 which defines interior space 22 within cap member 18. Sidewall 20 forms continuous wall member 24 positioned within cap member 18. Continuous wall member 24 defines opening 26 providing access to interior space 22. Continuous wall member 24 is configured to create an interference compression fit between end portion 12 of fastener 14 and continuous wall member 24. Method 64 further includes deforming 68 of continuous wall member 24' creating an interference compression fit between continuous wall member 24' and end portion 12 of fastener 14.

Positioning 66 of cap member 18 further includes positioning cap member 18 against structure 16. Sidewall 20 forms wall member 40 positioned spaced from continuous wall member 24. Wall member 40 extends about continuous wall member 24 and channel 44 defined by sidewall 20 is positioned between wall member 40 and continuous wall member 24. Wall member 40 defines two ports 46, 48 which extend through wall member 40 and are in fluid communication with channel 44. Method 64 further includes injecting sealant 62 into channel 44 through one of the two ports 46, 48.

While various embodiments have been described above, this disclosure is not intended to be limited thereto. Variations can be made to the disclosed embodiments that are still within the scope of the appended claims.

What is claimed:

1. A protection seal cap for enclosing an end portion of a fastener which extends from a structure, the protection seal cap comprising:
   a cap member including a sidewall that defines an interior space within the cap member, wherein:
      the sidewall forms a continuous wall member positioned within the cap member;
      the continuous wall member defines an opening that provides access to the interior space, wherein the continuous wall member includes an inner surface facing the opening to present an outer boundary of the opening, and wherein the inner surface is a continuously flat configuration around the opening; and
      the continuous wall member is configured to create an interference compression fit between the end portion of the fastener and the continuously flat configuration of the inner surface of the continuous wall member.

2. The protection seal cap of claim 1, wherein the sidewall has a width dimension greater than a first width dimension of the continuous wall member.

3. The protection seal cap of claim 1, wherein the continuous wall member extends in a direction away from the sidewall of the cap member which defines the interior space.

4. The protection seal cap of claim 3, wherein:
   the continuous wall member has a first end surface; and
   the first end surface of the continuous wall member is positioned within a first plane.

5. The protection seal cap of claim 1, wherein the sidewall forms a wall member positioned spaced from the continuous wall member.

6. The protection seal cap of claim 5, wherein the wall member extends in a direction away from the sidewall of the cap member which defines the interior space.

7. The protection seal cap of claim 6, wherein:
the wall member has a second end surface; and
the second end surface is configured such that the second end surface extends within a second plane.

8. The protection seal cap of claim 7, wherein a channel is positioned extending about the continuous wall member and positioned between the continuous wall member and the wall member.

9. The protection seal cap of claim 8, wherein the wall member defines two ports such that the two ports are in fluid communication with the channel, and wherein the two ports are spaced apart from each other.

10. The protection seal cap of claim 9, wherein the two ports are each positioned on opposing sides of the cap member, and the two ports have substantially the same configuration.

11. The protection seal cap of claim 9, wherein:
a first flow path extends from outside of the cap member through a first port of the two ports and into the channel; and
a second flow path extends from inside of the channel to a second port of the two ports and through the second port to outside of the cap member.

12. The protection seal cap of claim 1, wherein the fastener is constructed of a harder material than that of a material which constructs the continuous wall member.

13. The protection seal cap of claim 1, wherein:
the end portion of the fastener engages the inner surface of the continuous wall member at a plurality of contact locations spaced from each other around the opening to create the interference compression fit;
the continuous wall member has a first thickness around the opening at the contact locations between the end portion of the fastener and the inner surface of the continuous wall member;
the continuous wall member has a second thickness around the opening at a plurality of non-contact locations spaced from the contact locations; and
the second thickness is greater than the first thickness.

14. The protection seal cap of claim 1, wherein:
the continuous wall member has a triangular-circular cross-sectional configuration defined by a plurality of side walls spaced from each other and a plurality of curved walls;
each one of the curved walls is disposed between a respective pair of the side walls;
the end portion of the fastener engages the inner surface of the continuous wall member at a plurality of contact locations spaced from each other to create the interference compression fit;
each of the contact locations are disposed along a respective one of the side walls of the triangular-circular cross-sectional configuration; and
each of the curved walls include a non-contact location spaced from the contact locations, and the non-contact location of each of the curved walls form a gap between the end portion of the fastener and the inner surface of the continuous wall member when the end portion of the fastener engages the inner surface of the continuous wall member at the contact locations.

15. The protection seal cap of claim 1, wherein:
the sidewall includes a wall member positioned spaced apart from the continuous wall member to define a channel between the wall member and the continuous wall member;
the wall member extends outwardly away from the sidewall to a distal end surface; and
the wall member defines a plurality of ports that intersect the distal end surface.

16. A method for holding a protection seal cap against a structure and enclosing an end portion of a fastener which extends from the structure, the method comprising:
positioning a cap member of the protection seal cap over the end portion of the fastener wherein:
the cap member includes a sidewall which defines an interior space within the cap member;
the sidewall forms a continuous wall member positioned within the cap member; and
the continuous wall member defines an opening that provides access to the interior space, wherein the continuous wall member includes an inner surface facing the opening to present an outer boundary of the opening, and wherein the inner surface is a continuously flat configuration around the opening; and
deforming the continuous wall member to create an interference compression fit between the continuously flat configuration of the inner surface of the continuous wall member and the end portion of the fastener.

17. The method of claim 16, wherein:
the sidewall includes a wall member that extends outwardly away from the sidewall to a distal end surface, and the wall member defines a plurality of ports that intersect the distal end surface; and
the positioning of the cap member further includes positioning the cap member against the structure such that the distal end surface of the wall member abuts the structure.

18. The method of claim 16,
wherein the sidewall forms a wall member positioned spaced apart from the continuous wall member to define a channel therebetween;
wherein the wall member extends about the continuous wall member;
wherein the wall member defines a plurality of ports which extend through the wall member and are in fluid communication with the channel; and
further including injecting sealant into the channel through one of the ports.

19. The method of claim 16, wherein:
the continuous wall member has a triangular-circular cross-sectional configuration defined by a plurality of side walls spaced from each other and a plurality of curved walls;
each one of the curved walls is disposed between a respective pair of the side walls;
deforming the continuous wall member to create the interference compression fit further includes engaging the end portion of the fastener with the inner surface of the continuous wall member at a plurality of contact locations along the side walls to create the interference compression fit; and
each of the curved walls include a non-contact location spaced from the contact locations, and the non-contact location of each of the curved walls form a gap between the end portion of the fastener and the inner surface of the continuous wall member when the end portion of the fastener engages the inner surface of the continuous wall member at the contact locations.

20. The method of claim 16, wherein:
deforming the continuous wall member to create the interference compression fit further includes engaging the end portion of the fastener with the inner surface of the continuous wall member at a plurality of contact locations spaced from each other around the opening to create the interference compression fit;

engaging the end portion of the fastener with the inner surface of the continuous wall member causes the continuous wall member to have a first thickness around the opening at the contact locations between the end portion of the fastener and the inner surface of the continuous wall member, and causes the continuous wall member to have a second thickness around the opening at a plurality of non-contact locations spaced from the contact locations; and the second thickness is greater than the first thickness.

\* \* \* \* \*